(12) United States Patent  
Beaurepaire (10) Patent No.: US 9,214,043 B2  
(45) Date of Patent: Dec. 15, 2015

(54) GESTURE BASED MAP ANNOTATION

(71) Applicant: HERE Global B.V., Veldhoven (NL)

(72) Inventor: Jerome Beaurepaire, Berlin (DE)

(73) Assignee: HERE Global B.V., Veldhoven (NL)

( * ) Notice: Subject to any disclaimer, the term of this patent is extended or adjusted under 35 U.S.C. 154(b) by 89 days.

(21) Appl. No.: 13/783,824

(22) Filed: Mar. 4, 2013

(65) Prior Publication Data

US 2014/0247282 A1    Sep. 4, 2014

(51) Int. Cl.
*H04W 4/26* (2009.01)
*G06T 19/00* (2011.01)
*G06F 3/01* (2006.01)
*G06F 3/0346* (2013.01)
*H04W 4/02* (2009.01)
*G01C 21/36* (2006.01)

(52) U.S. Cl.
CPC .............. *G06T 19/006* (2013.01); *G06F 3/014* (2013.01); *G06F 3/017* (2013.01); *G06F 3/0346* (2013.01); *H04W 4/026* (2013.01); *G01C 21/3682* (2013.01); *G06F 2203/0331* (2013.01)

(58) Field of Classification Search
CPC ..................... G06F 3/011; G06F 3/017; G05B 2219/32014; G06T 19/006
USPC ................. 345/156, 179, 419, 629, 633, 661; 715/863
See application file for complete search history.

(56) References Cited

U.S. PATENT DOCUMENTS 5,276,785 A * 1/1994 Mackinlay et al. ........... 345/427
7,148,898 B1 * 12/2006 Howard et al. ............... 345/581
2006/0031755 A1 * 2/2006 Kashi ............................ 715/512
2007/0233367 A1 * 10/2007 Chen et al. .................... 701/207
2008/0027418 A1 * 1/2008 Berry ............................... 606/5
2008/0292213 A1 * 11/2008 Chau .............................. 382/294
2008/0294678 A1 * 11/2008 Gorman et al. ............... 707/102
2009/0228779 A1 * 9/2009 Williamson et al. .......... 715/233
2009/0251407 A1 10/2009 Flake et al.
2010/0090949 A1 4/2010 Tianqiao et al.
2010/0104174 A1 * 4/2010 Rohlf et al. .................... 382/154
2010/0214111 A1 * 8/2010 Schuler et al. ............. 340/686.1

(Continued)

FOREIGN PATENT DOCUMENTS

WO   WO 2009/116079 A2   9/2009
WO   WO 2010/069406 A1   6/2010
WO   WO 2011/055326 A1   5/2011

OTHER PUBLICATIONS

Sylvain Lefebvre, Samuel Hornus, Fabrice Neyret, Texture Sprites: Texture Elements Splatted on Surfaces, 2005, Proceedings of the 2005 symposium on Interactive 3D graphics and games, pp. 163-170.*

(Continued)

*Primary Examiner* — Xiao Wu
*Assistant Examiner* — Michael J Cobb
(74) *Attorney, Agent, or Firm* — Alston & Bird LLP (57) ABSTRACT

A method, apparatus and computer readable medium provide for gesture based map annotation. In the context of a method, an annotation is made to a map that includes a three-dimensional model of geographic elements. The annotation is based on a free-space user gesture and is positioned at an annotation point on a surface of the three-dimensional model of the map. The annotation point is derived from a geographic location and a gesture direction associated with the user gesture.

22 Claims, 8 Drawing Sheets

(56) References Cited

U.S. PATENT DOCUMENTS

| | | | |
|---|---|---|---|
| 2011/0006977 A1 | 1/2011 | Khosravy et al. | |
| 2011/0010676 A1* | 1/2011 | Khosravy et al. | 715/863 |
| 2011/0032145 A1* | 2/2011 | Hansen et al. | 342/357.34 |
| 2011/0213664 A1* | 9/2011 | Osterhout et al. | 705/14.58 |
| 2011/0231757 A1* | 9/2011 | Haddick et al. | 715/702 |
| 2011/0267265 A1* | 11/2011 | Stinson | 345/157 |
| 2012/0038652 A1 | 2/2012 | Yang | |
| 2012/0225719 A1* | 9/2012 | Nowozin et al. | 463/36 |
| 2012/0240077 A1 | 9/2012 | Vaittinen et al. | |
| 2013/0321257 A1* | 12/2013 | Moore et al. | 345/156 |

OTHER PUBLICATIONS

Shwetak N. Patel, Jun Rekimoto, Gregory D. Abowd, iCam: Precise at-a-Distance Interaction in the Physical Environment, 2006, Pervasive 2006, LNCS 3968, pp. 272-287.*

Eric Bier, Skitters and Jacks: Interactive 3D Positioning Tools, 1986, Proceedings of the 1986 workshop on Interactive 3D graphics, pp. 183-196.*

Ferran Argelaguet (Sanz), Carlos Andujar, A Survey of 3D Object Selection Techniques for Virtual Environments, 2013, Computers and Graphics, Elsevier, 37(3):121-136, <10.1016/j.cag.2012.12.003>, <hal-00907787>.*

Frank Steinicke, Timo Ropinski, Klaus Hinrichs, Object Selection in Virtual Environments Using an Improved Virtual Pointer Metaphor, 2006, Computer Vision and Graphics, pp. 320-326.*

International Search Report and Written Opinion for Application No. PCT/EP2014/053793 dated May 22, 2014.

Agrawal, S. et al., *Using Mobile Phones to Write in Air*, MobiSys'11 (Jun.-Jul. 2011), pp. 15-28.

Amma, C. et al., *Airwriting Recognition Using Wearable Motion Sensors*, Augmented Human Conference (Apr. 2-3, 2010) 8 pages.

Ketabdar, H. et al., *Magiwrite: Towards Touchless Digit Entry Using 3D Space around Devices*, MobileHCI'10 (Sep. 2010) pp. 443-446.

Mistry, P., SixthSense—a wearable gestural interface (MIT Media Lab), [online] [retrieved Mar. 20, 2014]. Retrieved from the Internet: <URL: http://www.pranavmistry.com/projects/sixthsense/> (2010), 5 pages.

* cited by examiner

Figure 14 receiving a free space user gesture — 1400 providing for the annotation of a map with an annotation based on the free space user gesture at an annotation point in the map, said annotation point derived from a geographic location at which the user gesture was made — 1405

GESTURE BASED MAP ANNOTATION

TECHNICAL FIELD

The present disclosure relates to the field of map annotation and gesture capture, associated methods, computer programs and apparatus. Certain disclosed aspects/examples relate to portable electronic devices, in particular, so-called hand-portable electronic devices which may be hand-held in use (although they may be placed in a cradle in use). Such hand-portable electronic devices include so-called Personal Digital Assistants (PDAs), mobile telephones, smartphones and other smart devices, and tablet PCs.

The portable electronic devices/apparatus according to one or more disclosed aspects/examples may provide one or more audio/text/video communication functions (e.g. tele-communication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

It is desirable for a user to make notes on places they have visited. For example, when a user visits a good restaurant, they may wish to record the location of the restaurant and add a note that the steak was particularly good. As a further example, the user may have found a bar that they wish to return to and therefore would like to quickly note its location before moving on somewhere else.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In a first aspect there is provided an apparatus comprising:
at least one processor; and
at least one memory including computer program code,
the at least one memory and the computer program code configured to, with the at least one processor, cause the apparatus to perform at least the following:
based on a received free-space user gesture associated with a real-world geographic location where the gesture was performed, provide for the making of an annotation to a map, the annotation being based on said user gesture and positioned at an annotation point in the map derived from said real-world geographic location This is advantageous as a user is able to use the apparatus to make a gesture in free space to create an annotation within a map at an appropriate point. The user does not have to open a mapping application to log a bookmark of the location and name it and so on. Instead, a simple gesture is captured and stored at an appropriate point in the map. Thus, geolocated notes can be added to an electronic map quickly and easily.

The apparatus may be configured to receive a gesture direction representing the direction in which the user gesture was made, the processor further configured to use the gesture direction to determine the annotation point. This is advantageous as the gesture direction can be used to identify a point at which the user was pointing when the gesture was made. Thus, the annotation does not have to be made at the precise point the gesture was made, but at the location the user was pointing at when the gesture was made.

The apparatus may be configured to annotate a map comprising a three-dimensional model of geographic elements and provide for the identification of an annotation point on a surface of the three-dimensional model using the geographic location and the gesture direction. This invention is particularly applicable for use with maps that include virtual three-dimensional models of the real world geographic environment. The apparatus can analyse the three-dimensional map model to work out where the user was pointing when the gesture was made.

The annotation may comprise a graphic element that is a direct representation of the gesture made by the user. This is advantageous as the user can trace out words or symbols or other markings relevant to them that will directly appear in the map. This provides a simple and quick method of adding information to the map using a free space gesture without direct interaction with a mapping application or touch screen input.

The apparatus may be configured to determine the graphic element from the user gesture, the user gesture comprising a three-dimensional gesture made by the user in free space. The annotation may comprise an alphanumeric note or graphic element that is associated with a predefined user gesture made by the user. This allows a simple gesture to be made by the user in free-space to effect the addition of a pre-prepared graphic element, which may be more complex than the user gesture. The apparatus may include a database or look-up table of user gestures and associated graphic elements such that a user can make a simple gesture, such as in the shape of a tick mark, and the apparatus can recognize that gesture and add a predetermined annotation, such as the word "Recommended" or a smiley face. The user may be able to associate particular gestures with pre-prepared notes or graphic elements. Annotating the map in this way is quick and easy, even if more complex or detailed annotation than can be traced out in free space is required.

The apparatus may include a communication module to receive gesture data representing at least the user gesture from a gesture recording element. It is advantageous for the apparatus that records the gesture to operate wirelessly so as not to impede the user while they make the gesture. However, the apparatus may use wired communication. For example, the user may connect a cable to download the captured gesture data at a convenient time.

The apparatus may be configured to determine the geographical location at which the user gesture was made from geographical location data included with the gesture data. This is advantageous as the apparatus that captures the gesture can also capture the real world geographic location.

The apparatus may include a geographic location determination module and the geographic location is determined by the geographic location determination module using the time that the user gesture was made by the user. Thus, the apparatus that captures the gesture may be separate from the apparatus that captures the geographic location at which the gesture was made. The time or other variable may be used to link the gesture data to the location at which the gesture was made.

The apparatus may be a portable electronic device, a wearable device, a ring, a wristband, a laptop computer, a mobile phone, a Smartphone, a tablet computer, a personal digital assistant, a digital camera, a watch, a server, or a module/ circuitry for one or more of the same or a non-portable electronic device, a desktop computer, a monitor, a server, or a module/circuitry for one or more of the same.

The apparatus may be configured to make the annotation to the map. Alternatively, it may pass instructions to a mapping application to make the instructed annotation.

The apparatus may be configured to supplement the annotation with extra information, such as a street address or telephone number or other information derivable from the Internet.

In a further aspect there is provided a method, the method comprising providing for the making of an annotation to a map, the annotation based on a free space user gesture and positioned at an annotation point in the map derived from a geographic location at which the user gesture was made.

In a further aspect there is provided an apparatus comprising:

at least one processor; and at least one memory including computer program code, the at least one memory and the computer program code configured to, with the at least one processor, cause the apparatus to perform at least the following:

capture gesture data representing a free space gesture made by a user and information to determine a real world geographical location at which the gesture was made by the user.

This "gesture capture" apparatus is advantageous as it provides a convenient means for capturing a free space gesture that is used for the annotation of a map.

The apparatus may be configured to determine a gesture direction representing the direction in which the gesture was made by the user.

The apparatus may be configured to determine the gesture direction by identifying the direction that the user was facing when the gesture was made.

The apparatus may be wearable and the apparatus is configured to determine the gesture direction by identifying the direction that the user is pointing when the gesture is made.

The apparatus may include a geographic location sensor for determining the real world geographic location at which the gesture was made. The sensor may comprise a Global Positioning System sensor or any other sensor capable of identifying the specific geographic location of the apparatus.

In a further aspect there is provided a method, the method comprising capturing gesture data representing a free space gesture made by a user and a information to determine a real world geographical location at which the gesture was made by the user.

In a further aspect there is provided a computer readable medium comprising computer program code stored thereon, the computer readable medium and computer program code being configured to, when run on at least one processor, perform at least the following:

based on a received free-space user gesture associated with a real-world geographic location where the gesture was performed, provide for the making of an annotation to a map, the annotation being based on said user gesture and positioned at an annotation point in the map derived from said real-world geographic location.

In a further aspect there is provided a computer readable medium comprising computer program code stored thereon, the computer readable medium and computer program code being configured to, when run on at least one processor, perform at least the following:

capture gesture data representing a free space gesture made by a user and information to determine a real world geographical location at which the gesture was made by the user.

In a further aspect there is provided an apparatus, the apparatus comprising means for providing for the annotation of a map, the annotation based on a free space user gesture and positioned at an annotation point derived from a real-world geographic location at which the user gesture was made.

The present disclosure includes one or more corresponding aspects, examples or features in isolation or in various combinations whether or not specifically stated (including claimed) in that combination or in isolation. Corresponding means and corresponding functional units (e.g. application loader, journal creation enabler . . . ) for performing one or more of the discussed functions are also within the present disclosure.

Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which.

DESCRIPTION OF EXAMPLE ASPECTS

The use of electronic maps on mobile devices is desirable as they allow a user to navigate and explore a geographical area. A location aware mobile device, which may use the Global Positioning System (GPS) or any other location determination method, can display the user's location on the electronic map. Electronic maps may include three-dimensional models of the geographical area. Thus, roads, buildings, trees, bridges and other geographical features may be represented in the electronic map as three-dimensional models. The use of three-dimensional models can provide a rich user experience as the electronic map can present a realistic depiction of the user's geographic environment, which can make orientation easier. As the user manipulates the electronic map, the three-dimensional model can be rendered from different angles to provide a virtual view of the geographical area.

It is also useful for a user to make notes of places they have visited. This may be achieved by noting a street address of the location. Alternatively, an electronic map application may provide means to add a marker to the electronic map. The adding of a marker may comprise the use of a touch-sensitive user input device to place a marker at a location that the user wishes to record. This can be a difficult procedure as the marker may not be placed accurately on the electronic map or it may be difficult to identify exactly the point on the map that corresponds to the geographic location. Further, the addition of a marker to an electronic map or the noting down of a street address is time consuming.

One or more examples of the present disclosure may provide advantages which overcome one or more of the above-mentioned problems. This disclosure relates to the annotation of a map using user gestures. In particular, we disclose an embodiment of a device configured to capture user gestures as well as a geographical location at which the gesture was made. We also disclose an embodiment of a device that is configured to receive data representing the gesture and geographic location and provide for the annotation of a map. Further, when the electronic map includes a three-dimensional model of the geographic area, an embodiment is disclosed in which the map is annotated by adding a graphical element to an identified surface of the three-dimensional model.

Figure 1:
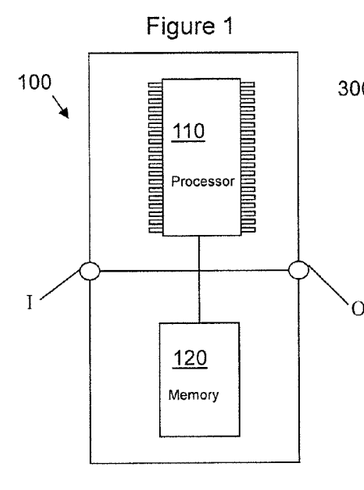
FIG. 1 illustrates an example apparatus according to the present disclosure.

FIG. 1 shows an apparatus 100 comprising a processor 110, memory 120, input I and output O. In this example only one processor and one memory are shown but it will be appreciated that other examples may utilise more than one processor and/or more than one memory (e.g. same or different processor/memory types). The apparatus 100 may be an application specific integrated circuit (ASIC) for a portable electronic device. The apparatus 100 may also be a module for a device, or may be the device itself, wherein the processor 110 is a general purpose CPU and the memory 120 is general purpose memory.

The input I allows for receipt of signalling to the apparatus 100 from further components. The output O allows for onward provision of signalling from the apparatus 100 to further components. In this example the input I and output O are part of a connection bus that allows for connection of the apparatus 100 to further components. The processor 110 is a general purpose processor dedicated to executing/processing information received via the input I in accordance with instructions stored in the form of computer program code on the memory 120. The output signalling generated by such operations from the processor 110 is provided onwards to further components via the output O.

The memory 120 (not necessarily a single memory unit) is a computer readable medium (such as solid state memory, a hard drive, ROM, RAM, Flash or other memory) that stores computer program code. This computer program code stores instructions that are executable by the processor 110, when the program code is run on the processor 110. The internal connections between the memory 120 and the processor 110 can be understood to provide active coupling between the processor 110 and the memory 120 to allow the processor 110 to access the computer program code stored on the memory 120.

In this example the input I, output O, processor 110 and memory 120 are electrically connected internally to allow for communication between the respective components I, O, 110, 120, which in this example are located proximate to one another as an ASIC. In this way the components I, O, 110, 120 may be integrated in a single chip/circuit for installation in an electronic device. In other examples one or more or all of the components may be located separately (for example, throughout a portable electronic device such as devices 200, 300, or through a "cloud", and/or may provide/support other functionality.

Figure 2:
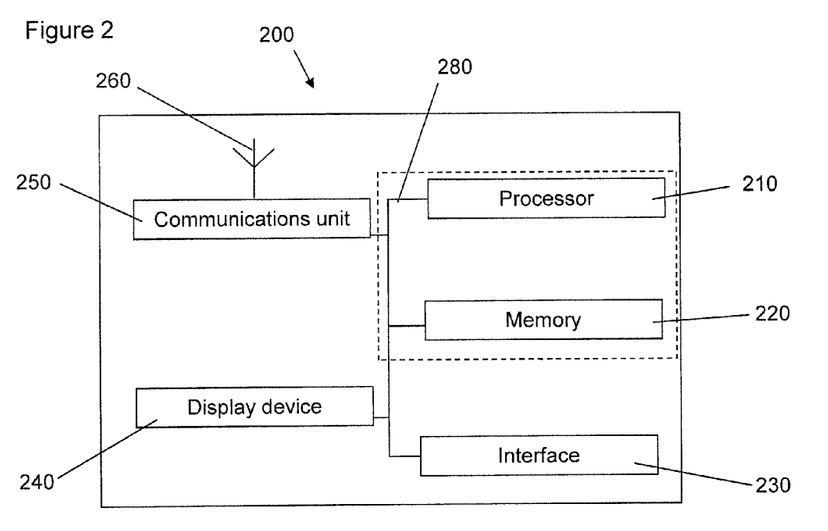
FIG. 2 illustrates another example.

One or more examples of the apparatus 100 can be used as a component for another apparatus as in FIG. 2, which shows a variation of apparatus 100 incorporating the functionality of apparatus 100 over separate components. In other examples the device 200 may comprise apparatus 100 as a module (shown by the optional dashed line box) for a mobile phone or PDA or audio/video player or the like. Such a module, apparatus or device may just comprise a suitably configured memory and processor.

The example apparatus/device 200 comprises a display 240 such as a Liquid Crystal Display (LCD), e-Ink, or touch-screen user interface. The device 200 is configured such that it may receive, include, and/or otherwise access data. For example, device 200 comprises a communications unit 250 (such as a receiver, transmitter, and/or transceiver), in communication with an antenna 260 for connection to a wireless network and/or a port (not shown). Device 200 comprises a memory 220 for storing data, which may be received via antenna 260 or user interface 230. The processor 210 may receive data from the user interface 230, from the memory 220, or from the communication unit 250. Data may be output to a user of device 200 via the display device 240, and/or any other output devices provided with apparatus. The processor 210 may also store the data for later user in the memory 220. The device contains components connected via communications bus 280.

The communications unit 250 can be, for example, a receiver, transmitter, and/or transceiver, that is in communication with an antenna 260 for connecting to a wireless network and/or a port (not shown) for accepting a physical connection to a network, such that data may be received via one or more types of network. The communications (or data) bus 280 may provide active coupling between the processor 210 and the memory (or storage medium) 220 to allow the processor 210 to access the computer program code stored on the memory 220.

The memory 220 comprises computer program code in the same way as the memory 120 of apparatus 100, but may also comprise other data. The processor 210 may receive data from the user interface 230, from the memory 220, or from the communication unit 250. Regardless of the origin of the data, these data may be outputted to a user of device 200 via the display device 240, and/or any other output devices provided with apparatus. The processor 210 may also store the data for later user in the memory 220.

Figure 3:
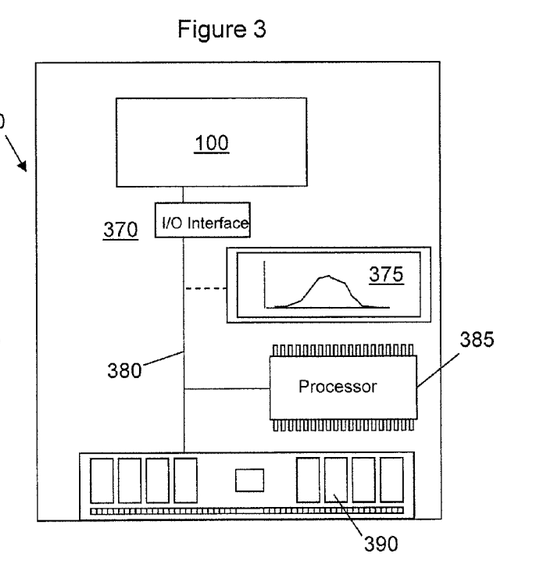
FIG. 3 illustrates a further example.

Device/apparatus 300 may be an electronic device (including a tablet personal computer), a portable electronic device, a portable telecommunications device, or a module for such a device. The apparatus 100 can be provided as a module for device 300, or even as a processor/memory for the device 300 or a processor/memory for a module for such a device 300. The device 300 comprises a processor 385 and a storage medium 390, which are electrically connected by a data bus 380. This data bus 380 can provide an active coupling between the processor 385 and the storage medium 390 to allow the processor 385 to access the computer program code.

The apparatus 100 in FIG. 3 is electrically connected to an input/output interface 370 that receives the output from the apparatus 100 and transmits this to the device 300 via data bus 380. Interface 370 can be connected via the data bus 380 to a display 375 (touch-sensitive or otherwise) that provides information from the apparatus 100 to a user. Display 375 can be part of the device 300 or can be separate. The device 300 also comprises a processor 385 that is configured for general control of the apparatus 100 as well as the device 300 by providing signalling to, and receiving signalling from, other device components to manage their operation.

The storage medium 390 is configured to store computer code configured to perform, control or enable the operation of the apparatus 100. The storage medium 390 may be configured to store settings for the other device components. The processor 385 may access the storage medium 390 to retrieve the component settings in order to manage the operation of the other device components. The storage medium 390 may be a temporary storage medium such as a volatile random access memory. The storage medium 390 may also be a permanent storage medium such as a hard disk drive, a flash memory, or a non-volatile random access memory. The storage medium 390 could be composed of different combinations of the same or different memory types.

Figure 4:
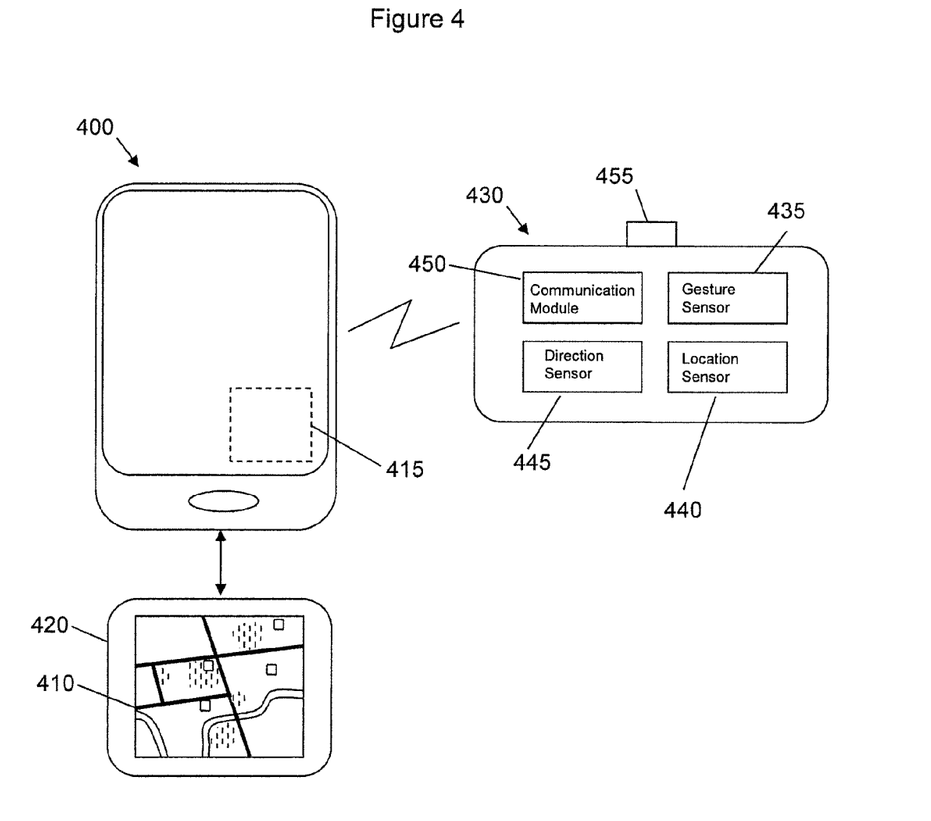
FIG. 4 illustrates a first exemplary embodiment of the invention.

FIG. 4 shows an apparatus 400, which in this exemplary embodiment comprises a Smartphone. While a Smartphone will be used to illustrate the invention in the following exemplary embodiments, it will be appreciated that the invention could be embodied on any appropriate apparatus, such as those discussed above, a computer, processor or mobile device among others.

The apparatus 400 has access to a map 410 which is stored remotely on a server 420. The map 410 is accessible by the apparatus 400 via the Internet. It will be appreciated that the map may, alternatively, be loaded into memory of the apparatus 400. The map includes a three-dimensional model of the geographic area. Thus, buildings and possibly other real-world objects are represented in the map by three-dimensional models.

The apparatus 400 is configured to add annotations to the map 410 as will be described in more detail below.

The apparatus 400 includes a communication module 415 which is configured to wirelessly communicate with a gesture capture apparatus 430. The communication module 415 may use the BLUETOOTH® communication standard, for example. The communication module may be configured to use a different communication standard or may be configured to utilise numerous communication standards such as such as Wi-Fi, Global System for Mobile Communications (GSM) or Universal Mobile Telecommunications System (UMTS) among others.

The gesture capture apparatus 430 is also shown in FIG. 4. The gesture capture apparatus may comprise a finger ring that is adapted to be worn by a user in this exemplary embodiment (although it is shown as a box in FIG. 4). The gesture capture apparatus 430 includes a gesture sensor 435 for detecting the three-dimensional movement in free space of the gesture capture apparatus 430. Thus, the user gesture to be detected is independent of any touch input device and can be made in free space. The gesture capture apparatus includes a geographic location sensor 440 for determining the geographic location of the gesture capture apparatus 430. The geographic location sensor 440 may comprise a Global Positioning System (GPS) module, although any geographic location determination module may be used, such as a device that uses the signals from mobile telephone masts and/or other satellite based navigation system. The gesture sensor 435 detects the motion of the user's gesture. The gesture sensor 435 comprises a plurality of accelerometers, arranged to detect movement over three axes of motion that allow the movement of the gesture capture apparatus in space to be captured. Further, the gesture capture apparatus 430 includes a direction sensor 445. In this embodiment, the direction sensor comprises an electronic compass to determine the direction in which gesture capture apparatus 430 is facing. Thus, the gesture capture apparatus is able to determine its position and orientation in free space using the gesture sensor 435 and direction sensor 445 and its real world geographic location using the geographic location sensor 435.

The gesture capture apparatus 430 also includes a communication module 450. The communication module 450 is configured to communicate using the BLUETOOTH® communication standard, although any other suitable standard could be used, such as Wi-Fi or any other wireless or wired communication standard. The communication module 450 is configured to communicate with the communication module 415 of the apparatus 400.

The gesture capture apparatus 430 also includes a capture actuator 455 which comprises a button. The capture actuator 455, on actuation, is configured to cause the gesture capture apparatus to store data captured by the gesture sensor 435, direction sensor 445 and the geographic location sensor 440. The data may be captured for a predetermined capture period of time, until the capture actuator 455 is pressed again or until the gesture capture apparatus 430 determines that the user has completed the gesture.

Figure 5:
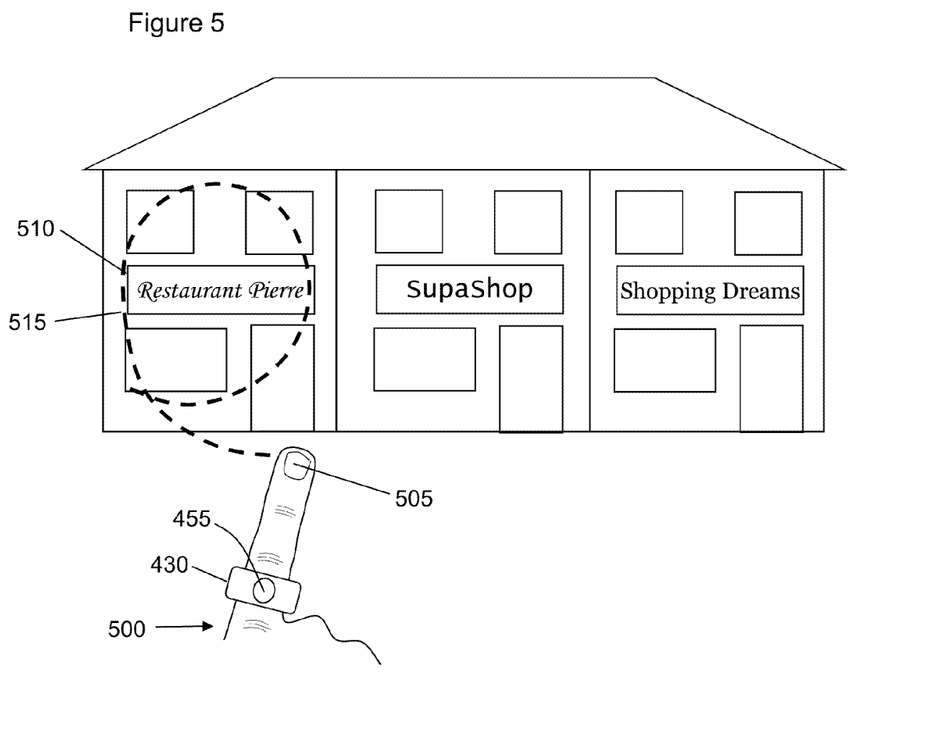
FIG. 5 illustrates an embodiment of the invention in use.

FIG. 5 shows a user 500 wearing the gesture capture apparatus 430 on their finger 505. The user also has their Smartphone 400 in their pocket (not visible). The gesture capture apparatus 430 is able to communicate with the Smartphone, via their respective communication modules 415, 450, without the user having to remove the Smartphone from their pocket.

In FIG. 5 the user has just left a restaurant 510 while exploring a city that they wish to return to at a later time. The present invention provides a convenient way of annotating a map with the location of the restaurant. The user presses the capture actuator 455, which causes the gesture capture apparatus 430 to start recording the data received from the gesture sensor 435. The user can then point (with the finger on which the gesture capture apparatus is worn) at the restaurant 510 and make a gesture 515 in free space. In this example, as shown by the dotted line the user has made a gesture comprising a rough circle that, from their point of view, circles the restaurant 510. The gesture sensor 435 monitors and records the three-dimensional movement of the gesture capture apparatus 430 as it moves in free space.

During the gesture, the gesture direction sensor 445 determines the direction in which the gesture capture apparatus 430 is pointing. The gesture direction sensor 445 may determine the direction by taking an average direction that was detected while the gesture was being made. Alternatively, the gesture direction sensor 445 may use data from the gesture sensor 435 to determine when the user extends their finger 505 towards the gestured to object. The gesture direction may then be determined based on the direction that is sensed at the time the user extends their finger. It will be appreciated that the gesture direction need not be determined during the gesture and could be determined before or after the gesture. Also, the gesture direction may be determined from analysing the gesture data itself.

The geographical location sensor 440 detects the geographical location of the gesture capture apparatus 430 on actuation of the capture actuator 455. The geographical location sensor may produce coordinates of the detected position on the Earth in any known coordinate scheme. Alternatively, it may output the geographic location with reference to another item or items, such as the geographic location relative to one or more mobile phone masts. It will be appreciated that the geographical location need not be determined during the gesture and could be determined before or after the gesture.

On completion of the user gesture, the user presses the capture actuator 455 to signify the end of the gesture. The gesture capture apparatus 430 then, using the communications module 450, sends data representing the user gesture, geographic location and gesture direction to the Smartphone 400. Alternatively, the gesture capture apparatus may store the information for sending to the Smartphone 400 at a later time.

The gesture capture apparatus 430 may format and/or edit the data before sending it. For example, the gesture capture apparatus 430 may edit the data representing the gesture by taking a selection of the data temporally spaced from the beginning of the data and/or the end of the data. Thus, this has the effect of discarding the first few and last few seconds of the user gesture. This is advantageous as this will ignore the action of the user pressing the capture actuator 455. The gesture data will therefore be more representative of the gesture that the user wished to record.

Smartphone 400 receives the gesture data including the geographic location and gesture direction. The Smartphone 400 is configured to use the information to annotate a map.

Figure 6:
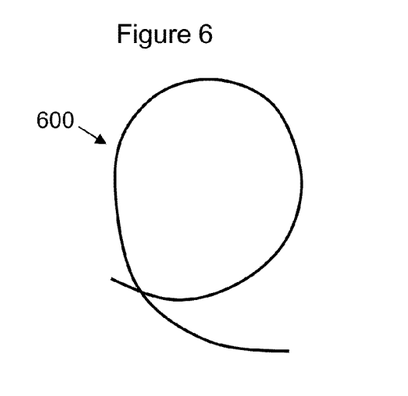
FIG. 6 illustrates an example of a graphic element for use in annotating a map.

In this embodiment, the Smartphone 400 interprets the gesture data to make a graphic element for annotating the map. The user gesture, made in three-dimensional space, is converted to a two-dimensional graphic element. FIG. 6 shows the graphic element 600 formed from the user gesture shown in FIG. 5, which is a direct representation of the gesture. It will be appreciated that the graphic element could comprise a three-dimensional model of the gesture for placement within the map.

Figure 7:
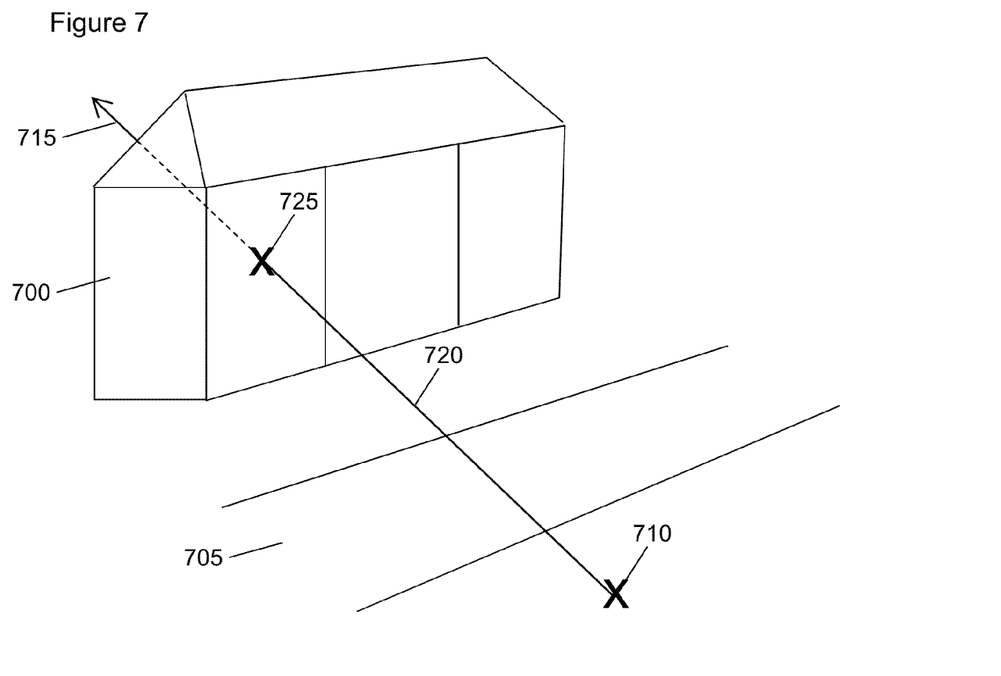
FIG. 7 illustrates an example of a three dimensional model of a building within a map.

An annotation point in the map is determined using the geographic location and the gesture direction. The annotation point can be a location in the map, a surface on the three dimensional model or a region of the map at which the annotation is placed. FIG. 7 shows the three-dimensional model of a map and a representation of how the annotation point is determined. FIG. 7 shows the three-dimensional model 700 of the real world restaurant 510. A three-dimensional model 705 of the road is also shown. A location in the map 710 corresponding to the geographic location is determined. A direction 715 in the map, corresponding to the gesture direction is also determined. A projection 720 from the determined map location 710 along the determined direction 715 is made and an incident point 725 is found where the projection first meets a surface of a three dimensional model 700 in the map. Thus, the three-dimension model 700 of the building that the user was gesturing towards is identified. The location of the surface 725 is designated the annotation point.

If a surface cannot be identified, the determined location 710 in the map may be designated the annotation point. Alternatively, the location of the nearest three-dimensional model object in the map to the determined location along the determined direction may be used even if the projection was not incident with it (which may be because the determined gesture direction caused the projection to just miss the building).

Figure 8:
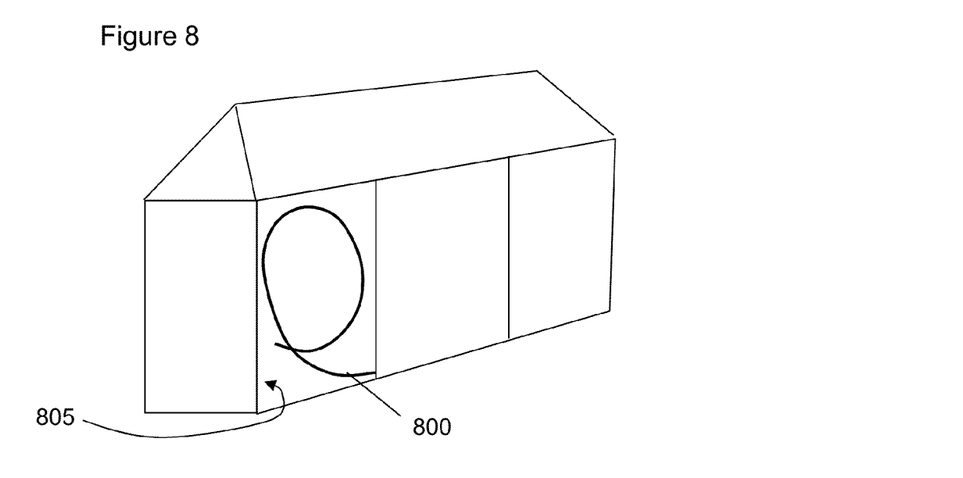
FIG. 8 illustrates an example of a three dimensional model within a map having an annotation applied thereto.

The Smartphone 400 effects the annotation of the map by passing the graphic element 800 and the annotation point to a mapping application, which may be present on the Smartphone or located on the server 420. The mapping application stores the graphic element 800 and annotation point for rendering onto the surface 805 of the three dimensional model of the building when the map is viewed, as shown in FIG. 8. It will be appreciated that the graphic element 800 is rendered onto the surface of the model along with any other surface graphics or textures that are applied (not shown in FIG. 8), such as street based photography graphics.

Accordingly, when the user opens their mapping application the graphic element is rendered onto the surface of the model at the annotation point. The user can therefore easily see where the restaurant is. It may be possible to add further information to the annotation at a later time, such as the name of the restaurant or its telephone number or what the user ate at the restaurant for example. Certain information may be collated automatically, such as the address, name and telephone number of the restaurant using a known address lookup service and searching of databases via the Internet. The user annotations may be personal to that user, public in that they are visible to all users of the mapping application and/or searchable so that the user can easily find them in the map.

In a second embodiment, the geographic location sensor 440 is located within the Smartphone 400 rather than the gesture capture apparatus 430. In this embodiment, gesture capture apparatus 430 is configured to capture information that will allow the determination of the real world geographic location at which the gesture was made. The gesture capture apparatus thus stores a time when the gesture was made. The Smartphone uses its geographic location sensor to track its real world geographic location and stores the locations with a time stamp. When the gesture data and gesture time is transferred to the apparatus 400, the apparatus can cross-reference the gesture time against its stored locations and timestamps to determine the geographic location where the gesture was made.

In a third embodiment, the apparatus 400 is configured to identify at least one predetermined user gesture and use a predetermined annotation in response to the user gesture. Accordingly, the apparatus 400 includes a look-up table of user gestures and an associated pre-drawn graphic element for use in annotating the map.

Figure 9:
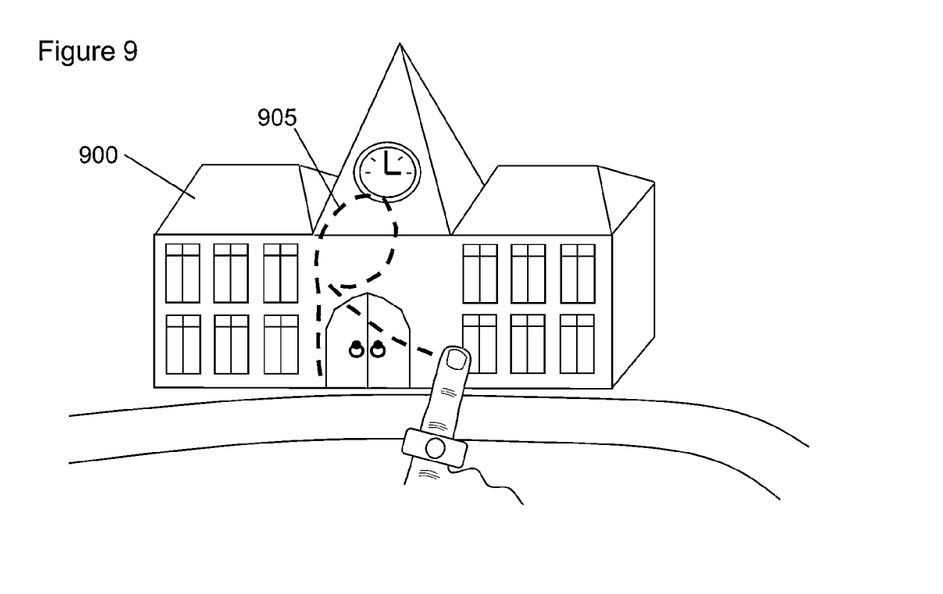
FIG. 9 illustrates a second embodiment of the invention in use.
Figure 10:
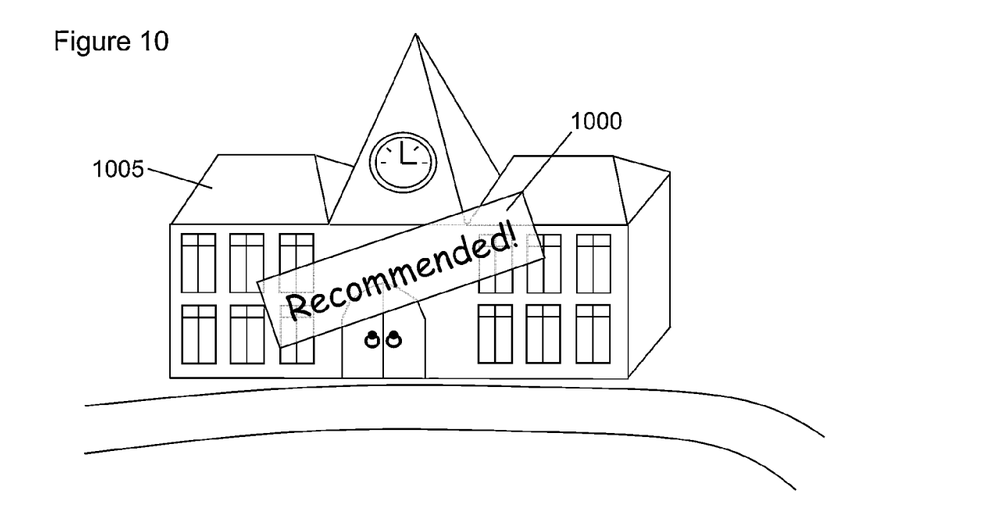
FIG. 10 illustrates a second example of a three dimensional model within a map having an annotation applied thereto.

FIG. 9 shows the user having visited a museum that they wish to recommend. The user makes a gesture 900 in free space that traces out a letter "R" while pointing towards the museum 905. The identification of the annotation point is performed in the same manner as in the previous embodiments. However, the apparatus 400 is configured to recognize that the user gesture has traced out an R. With reference to the look-up table, the apparatus searches to determine if there is a pre-drawn graphic element associated with that user gesture. In this embodiment, the apparatus determines that a graphic element that includes the word "RECOMMENDED" is associated with that user gesture. Thus, rather than using a direct representation of the user gesture to form the graphic element that is used as the annotation, the pre-drawn graphic is selected. FIG. 10 shows the resulting annotation 1000 that is applied to the surface of the three-dimensional model 1005. The model 1005 in FIG. 10 includes the surface texture derived from street level photographs to make the model resemble the real world building.

Figure 11:
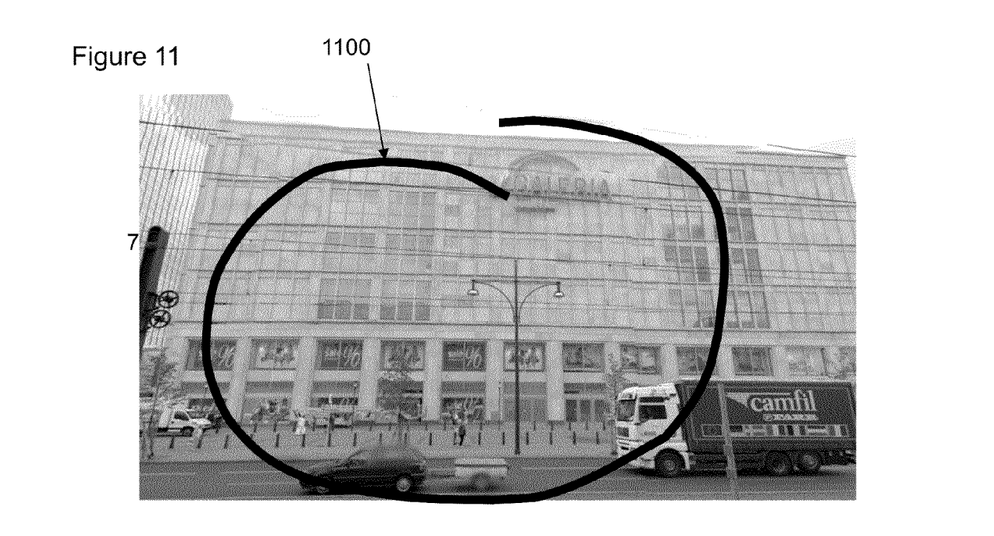
FIG. 11 illustrates a further example of a mapping application presenting an annotated map to a user.
Figure 12:
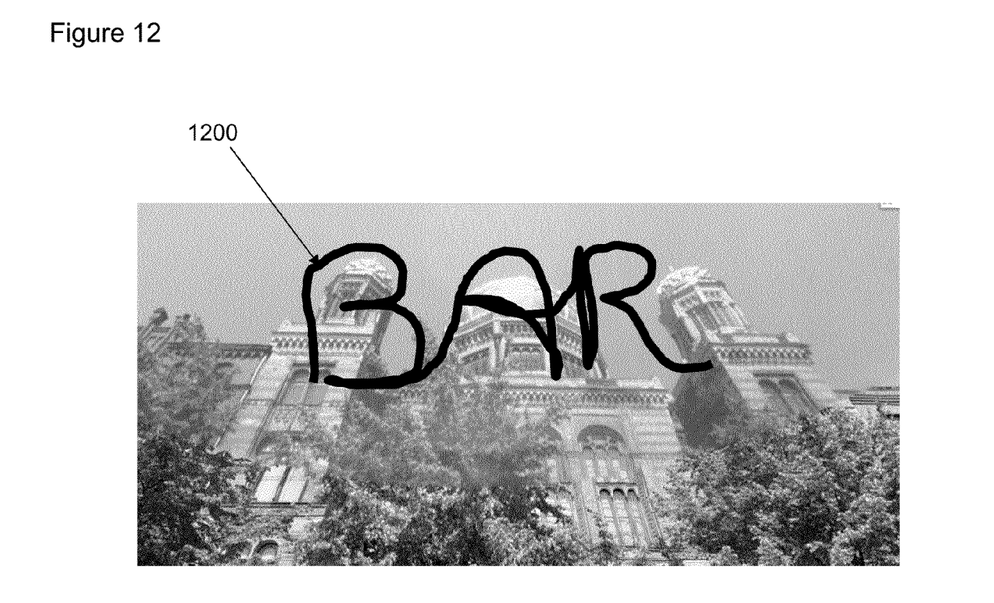
FIG. 12 illustrates a further example of a mapping application presenting an annotated map to a user.
Figure 13:
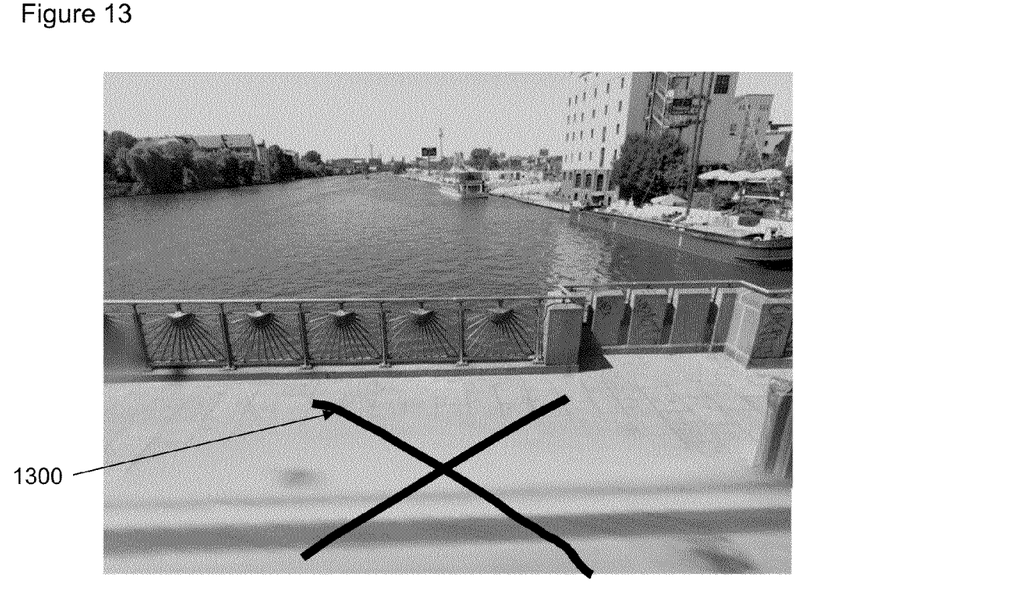
FIG. 13 illustrates a further example of a mapping application presenting an annotated map to a user.

If the apparatus cannot find the user gesture in the look up table, it is configured to form a direct representation of the user gesture for use as the annotation, as described in the first embodiment. An example of such an annotation 1100, 1200, 1300 presented to the user in a mapping application is shown in FIGS. 11, 12 and 13.

In a fourth embodiment, the functionality of the gesture capture apparatus is integrated into the Smartphone 400. The wireless communication modules 415, 450 are therefore no longer required. In this embodiment, the Smartphone 400 includes the capture actuator 455. On actuation of the capture actuator, the user can make a gesture while holding the Smartphone 400, which captures the user gesture in free space. The further operation of the apparatus is substantially similar to that of the previous embodiments.

It will be appreciated that, in the above embodiments, the user gesture has been captured using motion sensors, such as accelerometers. However, any suitable means for capturing a user gesture in free space can be used. For example, a camera, such as a stereoscopic camera, with appropriate feature identification software could track the movement of a user's hand and the user gesture could be determined therefrom. Further, in the first embodiment, the gesture capture apparatus comprised a ring, although it could be any other wearable apparatus, such as wristband.

The capture actuator 455, rather than be embodied as a button, may be a sensor. The sensor could detect the user tapping the gesture capture device to begin the capture process. Alternatively, it may detect the user extending their finger, possibly using data from the gesture sensor 435. The capture actuator 455 could alternatively detect a predetermined gesture or movement (possibly using the gesture sensor) to start the capture process, in which the gesture capture apparatus is caused to store data captured by the gesture sensor 435, direction sensor 445 and the geographic location sensor 440. Further, the capture actuator 455 may be any other actuator or may not be present at all and the data recorded by the gesture sensor 435 may be analysed to determine when a gesture was made.

Figure 14:
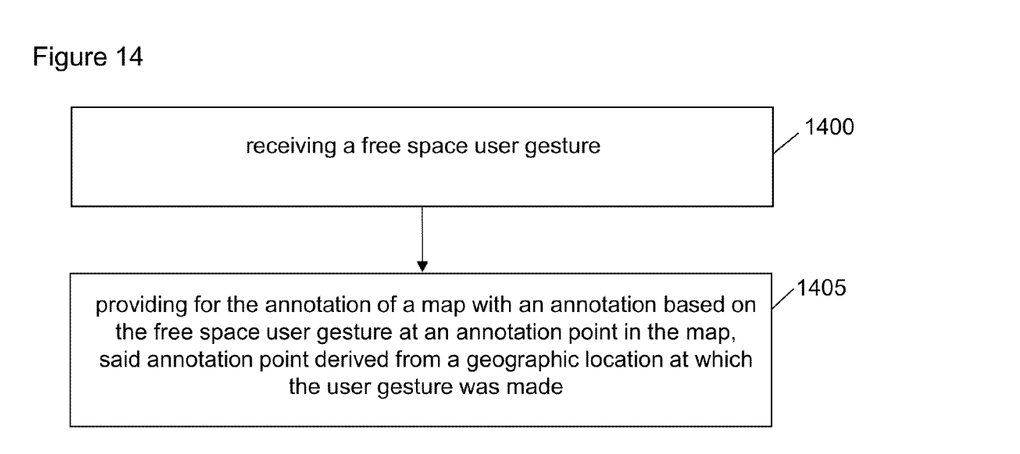
FIG. 14 illustrates a flowchart according to a method of the present disclosure.

FIG. 14 shows a flow diagram illustrating the steps of receiving a free space user gesture 1400 and providing for the annotation of a map with an annotation based on the free space user gesture at an annotation point in the map, said annotation point derived from a geographic location at which the user gesture was made 1405 and is self-explanatory.

Figure 15:
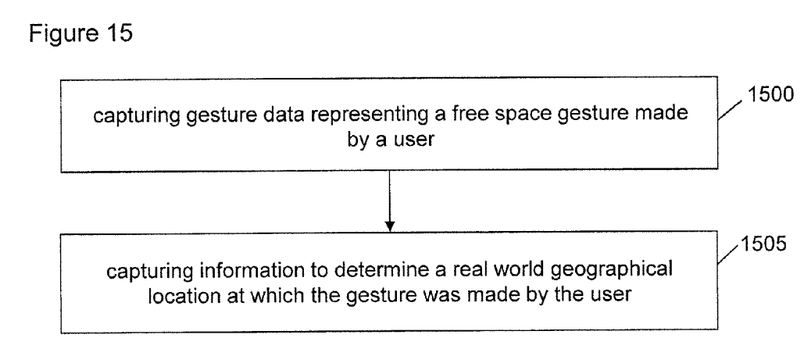
FIG. 15 illustrates a flowchart according to a method of the present disclosure.

FIG. 15 shows a flow diagram illustrating the steps of capturing gesture data representing a free space gesture made by a user 1500 and capturing information to determine a real world geographical location at which the gesture was made by the user 1505 and is self-explanatory.

Figure 16A:
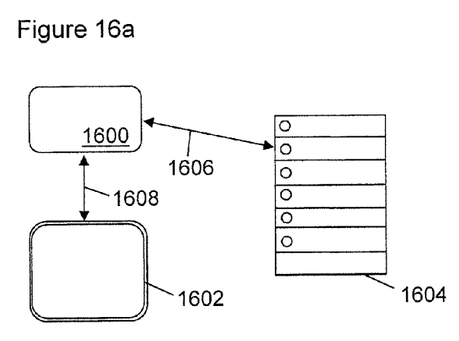
FIG. 16 illustrates an example of an apparatus.
Figure 16B:
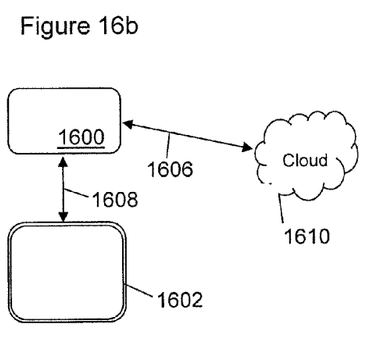

FIG. 16a shows an example of an apparatus 1600 in communication 1608 with a remote server. FIG. 16b shows an example of an apparatus 1600 in communication 1608 with a "cloud" for cloud computing. In FIGS. 16a and 16b, apparatus 1600 (which may be apparatus 100, 200, 300 or 400) is also in communication 1606 with a further apparatus 1602. The apparatus 1602 may in certain embodiments also communicate with the remote element 1604, 1610. The apparatus 1600 and further apparatus 1602 may, for example, be the Smart phone 400 and gesture capture apparatus discussed above. Communication may be via a communications unit, for example.

FIG. 16a shows the remote computing element to be a remote server 1604, with which the apparatus 1600, 1602 may be in wired or wireless communication (e.g. via the interne, BLUETOOTH® communication, NFC, a USB connection, or any other suitable connection as known to one skilled in the art). In FIG. 16b, the apparatus 1600, 1602 are in communication with a remote cloud 1610 (which may, for example, be the Internet, or a system of remote computers configured for cloud computing). For example, the Smartphone 400 and/or gesture capture apparatus 430 may send data to the remote element 1604, 1610 for processing rather than processing it locally.

Figure 17:
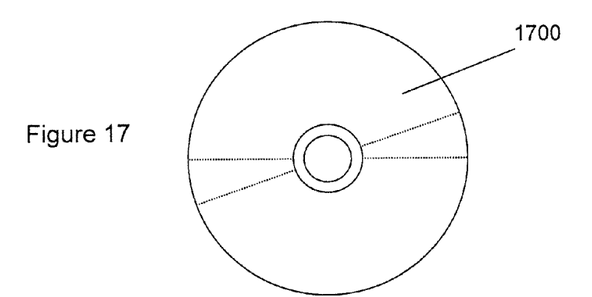
FIG. 17 illustrates schematically a computer readable medium providing a program.

FIG. 17 illustrates schematically a computer/processor readable medium 1700 providing a program according to an example. In this example, the computer/processor readable medium is a disc such as a digital versatile disc (DVD) or a compact disc (CD). In other examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

The apparatus shown in the above examples may be a portable electronic device, a laptop computer, a mobile phone, a Smartphone, a tablet computer, a personal digital assistant, a digital camera, a watch, a non-portable electronic device, a desktop computer, a monitor, a server, or a module/circuitry for one or more of the same.

Any mentioned apparatus/device/server and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
   at least one processor; and
   at least one memory including computer program code,
   the at least one memory and the computer program code configured to, with the at least one processor, cause the apparatus to perform at least the following:
   based on a received free-space user gesture associated with a real-world geographic location where the gesture was performed and a gesture direction representing the direction in which the user gesture was made, automatically provide for the making of an annotation to a map comprising three-dimensional models of geographic elements, the three-dimensional models including surfaces that correspond to real-world surfaces of geographical elements represented in the model, wherein analysis of the map of three-dimensional models using the real-world geographic location and the gesture direction provides for identification of an annotation point comprising a particular surface of the surfaces of the three-dimensional models, the annotation being based on said user gesture and positioned at the annotation point on the particular surface of the three-dimensional model of the map to be rendered onto said surface of the three-dimensional model and wherein if a particular surface cannot be identified, the annotation is positioned at a location in the map corresponding to the real-world geographic location.

2. An apparatus according to claim 1, wherein the annotation comprises a graphic element that is a direct representation of the gesture made by the user.

3. An apparatus according to claim 1, wherein the annotation comprises a predetermined alphanumeric note or pre-drawn graphic element that is associated with a predefined user gesture made by the user.

4. An apparatus according to claim 1, wherein the apparatus includes a communication module to receive gesture data representing at least the user gesture from a gesture capture apparatus.

5. An apparatus according to claim 4, wherein the apparatus is configured to determine the geographical location at which the user gesture was made from geographical location data included with the gesture data.

6. An apparatus according to claim 1, wherein the apparatus includes a geographic location determination module and the geographic location is determined by the geographic location determination module using the time that the user gesture was made by the user.

7. An apparatus according to claim 1, wherein the apparatus is configured to make the annotation to the map.

8. An apparatus according to claim 1, wherein the apparatus is a portable electronic device, a wearable device, a ring, a wristband, a laptop computer, a mobile phone, a Smartphone, a tablet computer, a personal digital assistant, a digital camera, a watch, a server, or a module/circuitry for one or more of the above-listed apparatuses or a non-portable electronic device, a desktop computer, a monitor, a server, or a module/circuitry for one or more of the non-portable electronic device, desktop computer, monitor, or server.

9. An apparatus according to claim 1, wherein the apparatus provides for the display of a map including a three-dimensional model of the real world geographic area, wherein the annotation is rendered onto the three-dimensional model.

10. An apparatus according to claim 1, wherein the apparatus provides for the association of particular user-selected or user-provided gestures with pre-prepared notes or graphic elements.

11. An apparatus according to claim 1, wherein the apparatus provides for supplementation of the annotation with extra information, including one or more of a street address or a telephone number.

12. An apparatus according to claim 1, wherein the annotation is provided for rendering onto the surface of the three-dimensional model of the map along with any other surface graphics or textures.

13. An apparatus according to claim 1, wherein the annotation point is based on a map location in the map of three-dimensional models of geographical elements derived from the real-world geographic location and the gesture direction, wherein the annotation point comprises a surface incident with a projection from the map location along the gesture direction.

14. An apparatus according to claim 1, wherein the annotation comprises a predetermined alphanumeric note or pre-drawn graphic element that is associated with a predefined user gesture made by the user determined using a look up table and if such an predefined user gesture is not present in the look up table, the annotation comprises a direct representation of the gesture made by the user.

15. A method, the method comprising
   automatically providing for the making of an annotation to a map comprising three-dimensional models of geographic elements, the three-dimensional models including surfaces that correspond to real-world surfaces of geographical elements represented in the model, wherein analysis of the map of three-dimensional models using a geographic location at which the user gesture was made and a gesture direction representing the direction in which the user gesture was made provides for identification of an annotation point comprising a particular surface of the surfaces of the three-dimensional models, the annotation based on a free space user gesture and positioned at the annotation point on the particular surface of the three-dimensional models of the map to be rendered onto said surface of the three-dimensional model and wherein if a particular surface cannot be identified, the annotation is positioned at a location in the map corresponding to the real-world geographic location.

16. A method according to claim 15, wherein the annotation comprises a graphic element that is a direct representation of the gesture made by the user.

17. A method according to claim 15, wherein the annotation comprises a predetermined alphanumeric note or pre-drawn graphic element that is associated with a predefined user gesture made by the user.

18. A method according to claim 15, wherein the method includes receiving gesture data representing at least the user gesture from a gesture capture apparatus.

19. A method according to claim 18, wherein the method includes determining the geographical location at which the user gesture was made from geographical location data included with the gesture data.

20. A method according to claim 15, wherein the method includes determining the geographic location using the time that the user gesture was made by the user.

21. A method according to claim 15, wherein the method includes making the annotation to the map.

22. A non-transitory computer readable medium comprising computer program code stored thereon, the computer readable medium and computer program code being configured to, when run on at least one processor, perform at least the following:

based on a received free-space user gesture associated with a real-world geographic location where the gesture was performed and a gesture direction representing the direction in which the user gesture was made, automatically provide for the making of an annotation to a map comprising three-dimensional models of geographic elements, the three-dimensional models including surfaces that correspond to real-world surfaces of geographical elements represented in the model, wherein analysis of the map of three-dimensional models using the real-world geographic location and the gesture direction provides for identification of an annotation point comprising a particular surface of the surfaces of the three-dimensional models, the annotation being based on said user gesture and positioned at the annotation point on the particular surface of the three-dimensional model of the map to be rendered onto said surface of the three-dimensional model and wherein if a particular surface cannot be identified, the annotation is positioned at a location in the map corresponding to the real-world geographic location.

* * * * *